United States Patent
Burmeister et al.

(10) Patent No.: US 7,158,518 B2
(45) Date of Patent: Jan. 2, 2007

(54) METHOD AND APPARATUS FOR TRANSMITTING DATA PACKETS

(75) Inventors: Carsten Burmeister, Langen (DE); Rolf Hakenberg, Langen (DE)

(73) Assignee: Matsushita Electric Industrial Co., Ltd., Osaka (JP)

( * ) Notice: Subject to any disclaimer, the term of this patent is extended or adjusted under 35 U.S.C. 154(b) by 837 days.

(21) Appl. No.: 09/909,823

(22) Filed: Jul. 23, 2001

(65) Prior Publication Data

US 2002/0027918 A1  Mar. 7, 2002

(30) Foreign Application Priority Data

Sep. 7, 2000  (EP) ................................ 00119566

(51) Int. Cl.
*H04L 12/56* (2006.01)

(52) U.S. Cl. ....................................... 370/392; 370/475

(58) Field of Classification Search ................ 370/394, 370/229, 230, 230.1, 401, 402, 410, 474, 370/522–524, 477, 392, 252, 349, 94.1, 94.2, 370/109, 110.1, 118, 58.1, 58.2, 58.3, 60, 370/82, 202, 324, 521, 467, 405, 475, 389, 370/350, 566, 351–356, 465, 476, 468–472, 370/248, 250, 400, 235, 466, 395; 341/51, 341/60, 65, 67; 709/216, 217, 246, 247

See application file for complete search history.

(56) References Cited

U.S. PATENT DOCUMENTS 5,535,199 A * 7/1996 Amri et al. ................. 370/392
6,300,887 B1 * 10/2001 Le ............................... 341/60
6,535,925 B1 * 3/2003 Svanbro et al. ............. 370/393
6,608,841 B1 * 8/2003 Koodli ........................ 370/474
6,680,921 B1 * 1/2004 Svanbro et al. ............. 370/324
6,680,955 B1 * 1/2004 Le ............................... 370/477
6,751,209 B1 * 6/2004 Hamiti et al. ............... 370/349
6,754,231 B1 * 6/2004 Jonsson et al. .............. 370/474

(Continued)

FOREIGN PATENT DOCUMENTS

WO  00/51307  8/2000

OTHER PUBLICATIONS

M. Degermark et al., "Low-Loss TCP/IP Header Compression for Wireless Networks", Wireless Networks, US, ACM, vol. 3, No. 5, Oct. 1, 1997, pp. 375-387, XP000728935, ISSN: 1022-0038.
S. Casner et al., "Compressing IP/UDP/RTP Headers for Low-Speed Links", IETF Internet Draft, Jul. 27, 1998, XP002125101.

*Primary Examiner*—Chi Pham
*Assistant Examiner*—Anh-Vu Ly
(74) *Attorney, Agent, or Firm*—Wenderoth, Lind & Ponack, L.L.P.

(57) ABSTRACT

A method and apparatus for transmitting data packets in a packet stream wherein the data packets have compressed headers. Update packets containing data indicating a context used in compressing the headers, and non-update packets are transmitted. An irregular change of the packet stream is detected and at least one packet stream parameter is obtained. Dependent on the determined packet stream parameter, either an extended update packet or an extended non-update packet is transmitted, wherein the extended packets include information about the irregular change. In addition, the packet stream parameter is estimated and a safety factor is applied.

20 Claims, 5 Drawing Sheets

U.S. PATENT DOCUMENTS

| | | | |
|---|---|---|---|
| 6,782,047 B1 * | 8/2004 | Le et al. | 375/240 |
| 6,839,339 B1 * | 1/2005 | Chuah | 370/349 |
| 6,882,637 B1 * | 4/2005 | Le et al. | 370/349 |
| 6,967,930 B1 * | 11/2005 | Burmeister et al. | 370/253 |
| 6,970,476 B1 * | 11/2005 | Jonsson et al. | 370/401 |
| 7,058,728 B1 * | 6/2006 | Eklund | 370/474 |

* cited by examiner

METHOD AND APPARATUS FOR TRANSMITTING DATA PACKETS

BACKGROUND OF THE INVENTION

1. Field of the Invention

The present invention generally relates to a method and apparatus for transmitting data packets in a packet stream over an unreliable channel, and, in particular, to transmitting data packets having compressed headers.

2. Description of the Related Art

Several communication technologies exist for transmitting data from one terminal to another terminal. The most commonly used techniques are cellular telephony and the Internet. Further developments are media-on-demand and conversational services such as Internet telephony. Most of these services require the transport of real-time data including audio and video contents.

The Real-time Transport Protocol (RTP) provides means for such purposes. RTP is an Internet protocol for transmitting data in real-time or nearly real-time. RTP itself does not guarantee real-time delivery of data, but does provide mechanisms for the sending and receiving of applications to support streaming data. Typically, RTP runs on top of the UDP protocol. UDP (User Datagram Protocol) is a connectionless protocol that, like TCP, runs on top of IP networks. Unlike TCP/IP, UDP/IP provides no error recovery services, but instead offers a direct way to send and receive datagrams over an IP network.

While RTP has been developed for fixed networks, RTP may nevertheless be used in mobile networks. However, one problem in using RTP over mobile networks is the limited bandwidth in the mobile channel. This is because each of the protocols RTP, UDP and IP has its own header. A packet will then, in addition to link layer framing, have an IP header of 20 bytes, a UDP header of 8 bytes, and an RTP header of 12 bytes, thus summing up to at least 40 bytes.

This header is highly redundant, and to decrease the amount of overhead, header compression mechanisms have been developed. Header compression protocols remove the redundancy of the header and encode the information in an efficient way. This may lead to a compression of the original header down to one byte in the best case.

A system using a header compression protocol is illustrated in FIG. 1. The transmitter comprises a compressor 100 which is used for compressing the original header. The compressed header is then transmitted to the receiver and is there decompressed by the decompressor 110.

The context 120 is the state which the compressor 100 uses to compress the header. The context is a set of variables and consists basically of an uncompressed version of the header fields of the last header. Besides the actual header fields, the context comprises additional variables, such as first order differences of header fields that have been detected to be constant for a series of successive packets. The context can also contain additional information describing the packet stream, for example, the typical inter-packet increase in sequence numbers or timestamps.

In operation, the compressor 100 and the decompressor 110 are required to maintain a common context. When the context 130 of the decompressor 110 is not consistent with the context 120 of the compressor 100, header decompression will fail. This situation can occur when data packets are transmitted over unreliable, e.g. wireless, channels because packets may then be lost or damaged between the compressor 100 and the decompressor 110.

It is therefore necessary to initiate a resynchronization procedure once the context 130 of the decompressor 110 has become invalid. For this purpose, update (UP) packets are provided for transmitting information contained in the context 120 of the compressor 100 to the decompressor 110. Thus, by using UP packets, the context 130 is updated.

The performance of a header compression scheme can be described with two parameters, compression efficiency and robustness. A robust scheme tolerates errors on the link over which header compression takes place without losing additional packets, introducing additional errors or using more bandwidth. Using UP packets increases on the one hand the robustness, but decreases compression efficiency, since UP packets are large in size. Therefore, in addition to UP packet, non-update (NUP) packets are used which are very small and which only depend on the previous UP packet. Thus, NUP packets do not update the context so that, if a NUP packet gets lost, the context 130 of the decompressor 110 continues to be valid, so that the receiver is still able to decompress the following packets.

The packet stream to be compressed usually behaves very regularly. Most of the header fields are constant and do not change during the life-time of the stream. Some fields do change with each packet (e.g. sequence number and timestamp). If the values of these fields are synchronized to the sequence number and thus can be calculated from this number, the stream is regular. Irregularities in these fields disturb this synchronization, e.g. because of a non-linear jump in the RTP-timestamp field. With an irregularity, it is not possible to calculate the values of the changed fields from the sequence number. These irregularities might occur quite frequently, e.g. on the average of every second for a conversational audio stream.

In case an irregular change has occurred, information about the irregular change has to be transmitted to the decompressor. Therefore, either UP or NUP packets have to be extended by this information. This can, for instance, be done by setting an extension bit in the header and by placing the irregularity information into a predefined extension field of the header. However, using extended UP (extUP) packets decreases the robustness, while using extended NUP (extNUP) packets decreases the compression efficiency.

SUMMARY OF THE INVENTION

The present invention has been made in consideration of the above situation. Accordingly, a primary object of the present invention is to provide a method and apparatus for transmitting data packets in a packet stream, where the method and apparatus are capable of improving both the compression efficiency and packet stream robustness.

It is another object of the present invention to allow for determining the optimum conditions for both compression efficiency and packet stream robustness.

It is still another object of the present invention to allow for dynamically adapting the transmission scheme to the channel and packet stream properties.

A further object of the present invention is to reduce the mean header size even when irregular changes of the packet stream occur.

Another object of the present invention is to allow for sending extNUP packets in case the irregular change is only valid for a short number of packets. This is because if extUP packets were used in the case of a short irregularity, the decompressor's context would be easily invalidated and the decompressor would not be able to decompress all subsequent packets until a new UP packet is received correctly.

That is, it is an object of the present invention to increase the packet stream robustness as compared with a transmission scheme in which irregularities are transmitted in extUP packets only.

Yet another object of the present invention is to increase the compression efficiency by avoiding using extNUP packets. As the number of NUP packets is usually greater than the number of UP packets, it is the object of the present invention to send extUP packets wherever possible.

These and other objects of the present invention will become more apparent hereinafter.

To achieve these objects, according to a first aspect of the present invention, there is provided a method of transmitting data packets in a packet stream, where the data packet have compressed headers. The method comprises the steps of compressing a header using a context, transmitting at least one update packet containing data indicating the context, and transmitting at least one non-update packet. The method further comprises the steps of detecting an irregular change of the packet stream, obtaining at least one packet stream parameter, and transmitting either an extended update packet or an extended non-update packet depending on the determined (obtained) packet stream parameter, where the extended packet includes information about the irregular change.

According to a second aspect, the invention provides an apparatus for transmitting data packets in a packet stream, where the data packets have compressed headers. The apparatus comprises a compressor for compressing a header using a context, transmission means for transmitting a least one update packet containing data indicating the context and at least one non-update packet, detection means for detecting an irregular change of the packet stream, and control means for obtaining at least one packet stream parameter and controlling the transmission means to transmit either an extended update packet or an extend non-update packet depending on the determined (obtained) packet steam parameter, where the extended packet includes information about the irregular change.

BRIEF DESCRIPTION OF THE DRAWINGS

The accompanying drawings are incorporated into and form a part of the specification to illustrate several embodiments of the present invention. These drawings together with the description serve to explain the principles of the present invention. The drawings are only for the purpose of illustrating preferred and alternative examples of how the present invention can be made and used and are not to be construed as limiting the present invention to only the illustrated and described embodiments. Further features and advantages will become apparent from the following and more particular description of the various embodiments of the invention, as illustrated in the accompanying drawings, wherein.

DETAILED DESCRIPTION OF THE INVENTION

The illustrative embodiments of the present invention will be described with reference to the drawings wherein like elements and structures are indicated by like reference numbers. Preferred embodiments of the present invention will be described in more detail hereinafter.

As will be apparent from the discussion below, the present invention makes use of at least one packet stream parameter. Packet stream parameter means any channel, packet stream and compressor-state property which can at least indirectly provide some information that might be suitable for deciding when and how to send information about an irregular change to the decompressor. In the preferred embodiments, the following parameters are used:

$N_1$: the number of packets that have been sent since the last update sequence;

$N_2$: the maximum number of consecutive packet loss over the channel, i.e. the maximum number of consecutively lost packets in the packet stream; and $N_3$: the number of subsequent packets of the stream for which an irregular change is valid, i.e. the time length of an irregularity in units of data packets.

Figure 1:
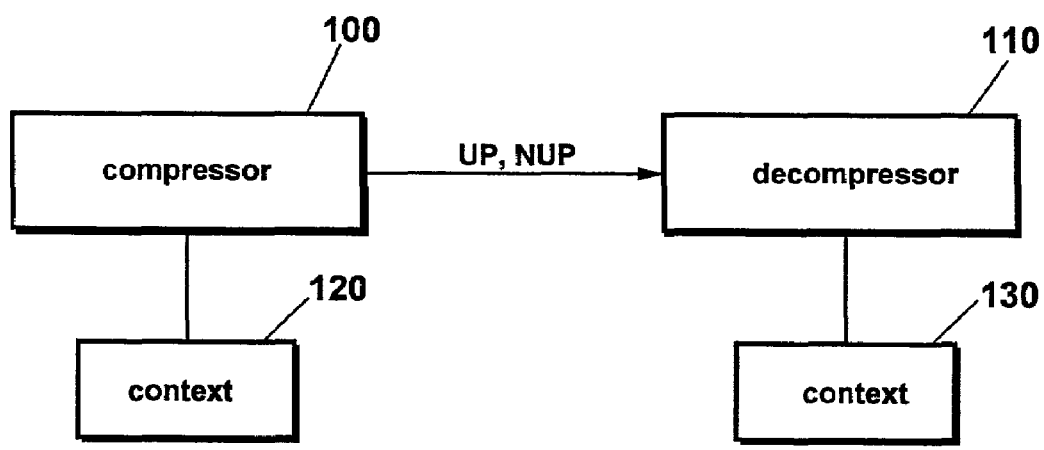
FIG. 1 illustrates a compressor/decompressor system, in which UP and NUP packets are used.
Figure 2:
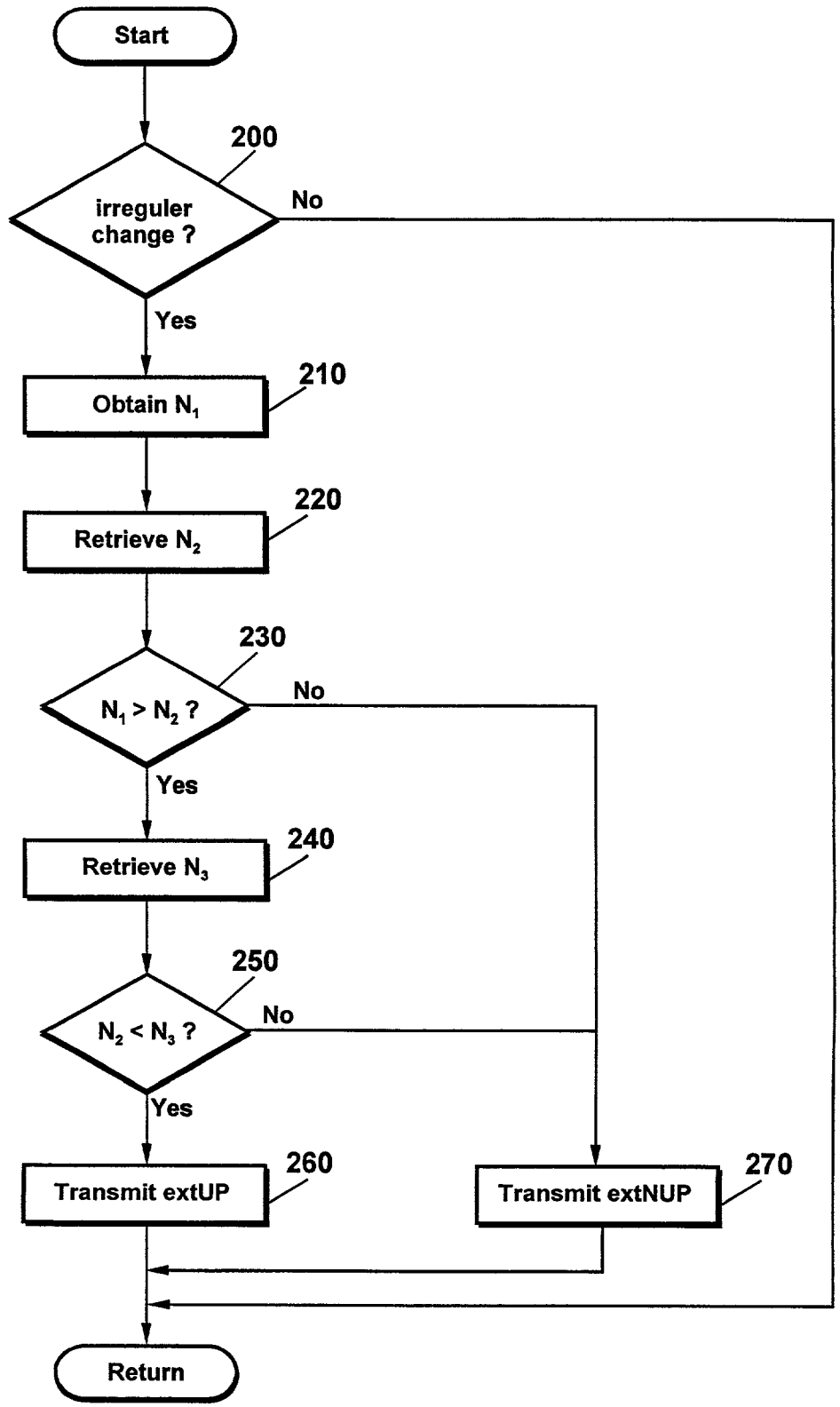
FIG. 2 is a flowchart illustrating the process of deciding when to transmit extUP or extNUP packets according to the present invention.

Referring now to FIG. 2, in deciding when to use extUP packets and when to use extNUP packets, the compressor 100 first determines in step 200 whether an irregular change of a packet stream has occurred. If no irregular change has occurred, there is no need to transmit extended packets at all, and the process returns. However, if it is determined in step 200 that an irregular change of a packet stream has occurred, the compressor 100 checks two separate conditions for deciding which packets to extend.

In checking the first condition, the compressor 100 obtains the parameter $N_1$ in step 210. Then, the parameter $N_2$ is retrieved in step 220. The parameter $N_2$ may, for instance, have previously been estimated by using the process which is described below in the context of FIG. 3. The compressor 100 then can simply retrieve the parameter from a storage unit or any other kind of data buffer.

Once the parameters $N_1$ and $N_2$ have been obtained, the compressor 100 performs a comparison between these values in step 230. If the parameter $N_1$ is not greater than the parameter $N_2$, it is decided in step 270 to transmit extNUP packets. Otherwise, the process continues with step 240.

In checking the second condition, the compressor 100 retrieves the parameter $N_3$ in step 240, again by accessing previously estimated values. It is then determined in step 250 whether $N_2$ exceeds $N_3$. If it is determined that $N_2$ exceeds $N_3$, it is again decided to transmit extNUP packets to the decompressor 110. Otherwise, the decompressor 110 will, in step 260, receive information about the irregular change via extUP packets.

Thus, extended UP (extUP) packets are transmitted only if both conditions 230, 250 are fulfilled. If at least one of conditions 230, 250 is not met, it is decided to transmit extNUP packets.

By this process, compression efficiency is increased because the irregular change is not transmitted in all packets, i.e. no larger extNUP packets have to be transmitted after the new context is established. Further, by sending extUP packets whenever necessary, robustness is increased.

While it has been described that condition 230 is checked before condition 250 in discussing FIG. 2, it will be appreciated by those of ordinary skill in the art that condition 250 may be alternatively checked first.

Preferably, the number of extUP packets in one sequence is adapted in step 260 to the parameter $N_2$, for reliably establishing the irregularities in the decompressor's 110 context 130. In a preferred embodiment, the number of extUP packets is set to be equal to N2.

As mentioned above, the parameters $N_2$ and $N_3$ are preferably retrieved in steps 220 and 240 from any kind of storage unit, and these parameters have to be previously estimated. While FIG. 3 illustrates a preferred embodiment of estimating the parameter $N_2$, the generation of $N_3$ estimates will be described in the context of FIGS. 4a and 4b.

Figure 3:
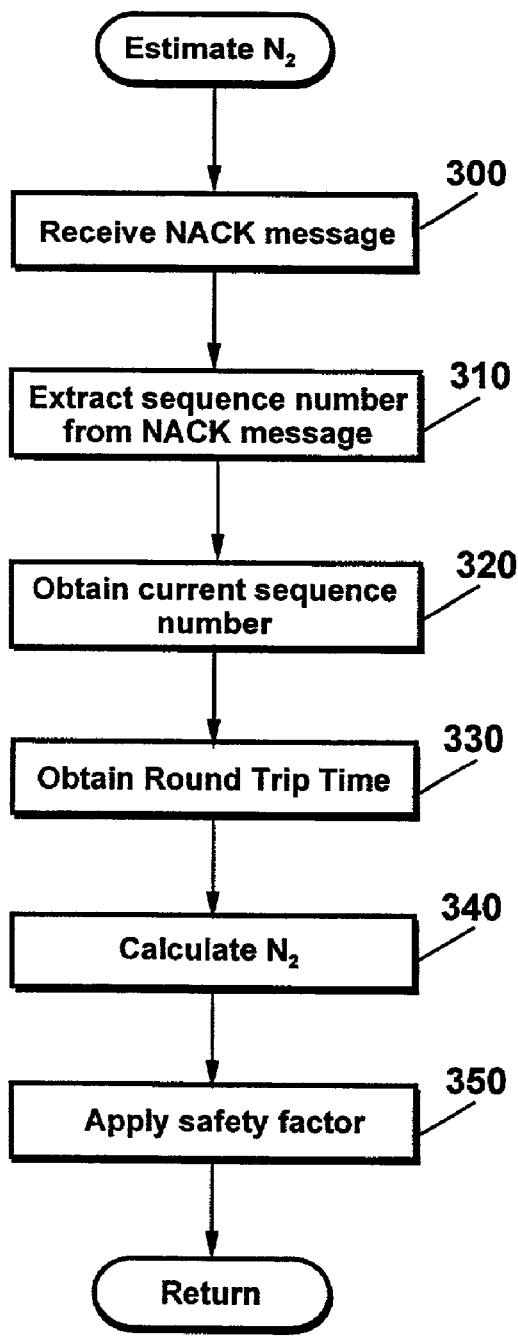
FIG. 3 is a flowchart illustrating the process of estimating the maximum number of consecutive packet loss according to a preferred embodiment of the present invention.

Referring now to FIG. 3, the estimation of the maximum number of consecutive packet loss is based on non-acknowledgement (NACK) packets that are sent from the decompressor 110 to the compressor 100. NACK packets are sent if an invalid context has been detected by the decompressor 110 due to a UP packet loss. The invalid context is detected upon reception of the first NUP packet which contains a sequence indication bit that is unequal to the one stored in the decompressor's 110 context 130.

In step 300, the compressor 100 receives a NACK packet or message from the decompressor 110 and extracts the sequence number of the last correctly decompressed packet, i.e. where the context was still valid, from this NACK message (step 310). Then, the compressor 100 obtains the current sequence number in step 320. From the extracted and the current sequence numbers, the compressor 100 is able to calculate the amount of packets which were sent to the decompressor 110 between the transmission time of the last correctly received packet and the reception time of the NACK message. In step 330, the compressor 100 obtains the Round Trip Time (RTT) which is, in this case, the time that is required to trigger and receive the NACK message. Then, the compressor 100 subtracts the obtained RTT value from the calculated amount of packets, thereby calculating the number of packets which were lost consecutively (step 340). This number is then made accessible to the compressor 100 as the parameter $N_2$.

Figure 4A:
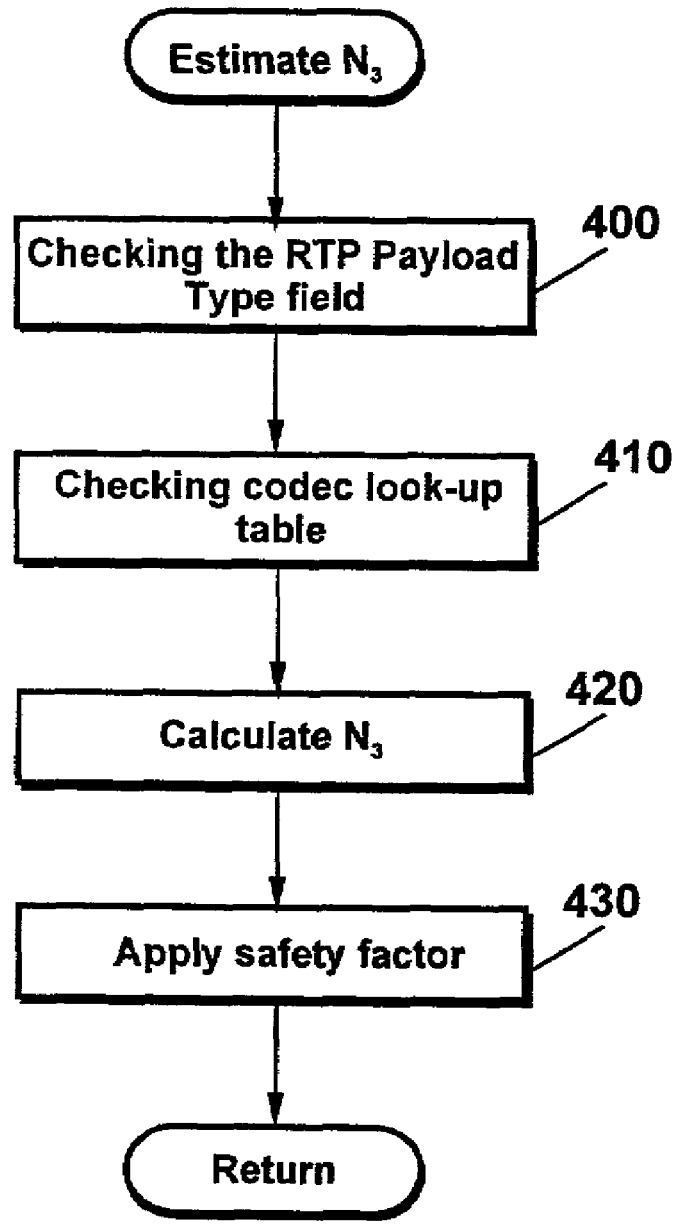
FIGS. 4a and 4b are flowcharts illustrating preferred embodiments of the process of estimating the number of packets for which the irregular change is valid.
Figure 4B:
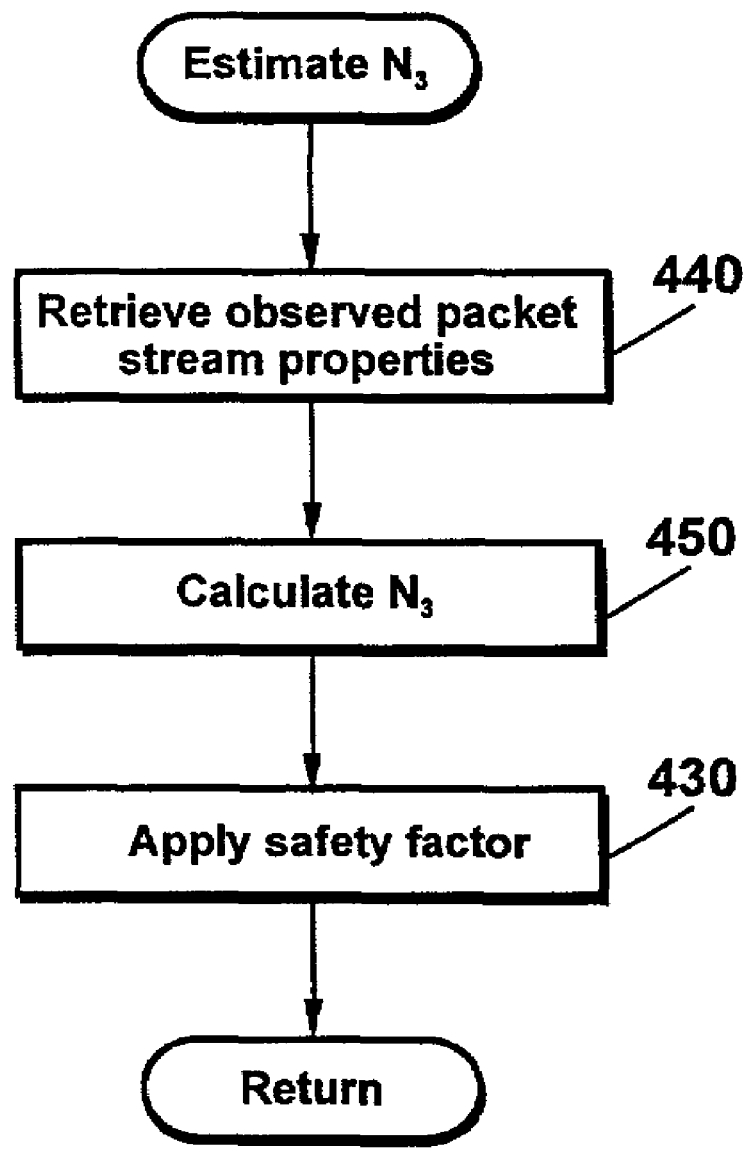

The estimation of $N_3$ is preferably done as depicted in FIGS. 4a and 4b. While knowledge about the used codec and its properties is used in the process of FIG. 4a, the process of FIG. 4b includes observing the packet stream and gaining estimations for the future from the experiences of the past. It will be appreciated by those of ordinary skill in the art that the processes of FIGS. 4a and 4b may be used alternatively as well as in combination.

In FIG. 4a, the compressor 100 knows the properties of different streams coming from different codecs. This information can be stored in a look-up table of the compressor 100. In step 400, the compressor checks the RTP Payload Type field of the header to know which is the codec being used. Then, the compressor 100 retrieves the necessary information about the codec from the look-up table in step 410 and calculates the parameter $N_3$ by using the retrieved information (step 420).

In the process of FIG. 4b, the compressor 100 retrieves in step 440 observed packet stream properties such as the maximum, minimum, average, variance of the average, etc, of the number of packets for which an irregular change is valid. These properties are preferably stored in a memory of the compressor 100. From this information, the compressor 100 calculates in step 450 an estimation of the parameter $N_3$ which depends on the degree of robustness one would like to have. Wishing a higher robustness implies that the chosen value is to be near the minimum number of packets.

As apparent from FIGS. 3, 4a and 4b, the estimation processes further include a step 350, 430 of applying a safety factor. This is to take into account that the calculated values of parameters N2 and N3 are only estimates. Thus, in order to ensure the robustness of the scheme, the estimated parameter $N_3$ is preferably divided by the safety factor which is greater than one, while the estimated parameter $N_2$ is preferably multiplied with this factor.

As will be appreciated by those of ordinary skill in the art, according to the present invention, a decision is made whether to send extUP or extNUP packets, based on at least one packet stream parameter. Thus, the present invention allows for determining the optimum conditions for both compression efficiency and packet stream robustness by dynamically adapting the transmission scheme to the channel and packet stream properties. This reduces the mean header size even when irregular changes of the packet stream occur.

While the present invention has been described with respect to the preferred physical embodiments constructed in accordance therewith, it will be apparent to those skilled in the art that various modifications, variations and improvements of the present invention may be made in the light of the above teachings and within the purview of the appended claims without departing from the spirit and intended scope of the present invention. In addition, those areas in which it is believed are familiar to those of ordinary skill in the art have not been described herein in order to not unnecessarily obscure the description of the present invention. Accordingly, it is to be understood that the present invention is not to be limited by the specific illustrative embodiments, but only by the scope of the appended claims.

What is claimed is:

1. A method of transmitting data packets in a packet stream, the data packets having compressed headers, said method comprising:
   compressing a header using a context;
   transmitting at least one update packet which updates the context;
   transmitting at least one non-update packet which does not update the context;
   detecting an irregular change of the packet stream;
   determining at least one packet stream parameter; and
   transmitting an extended update packet containing information about the irregular change if the determined at least one packet stream parameter fulfills a predetermined condition; and
   transmitting an extended non-update packet containing information about the irregular change if the determined at least one packet stream parameter does not fulfill the predetermined condition, wherein the extended non-update packet is not used to update the context.

2. The method according to claim 1, wherein the packet stream parameter is the maximum number of consecutive packet loss.

3. The method according to claim 2, wherein said method further comprises entering a context update phase if the number of packets sent since a last update phase is larger than the maximum number of consecutive packet loss.

4. The method according to claim 2, wherein the maximum number of consecutive packet loss is estimated by extracting a sequence number from a received non-acknowledgement message and comparing the extracted sequence number with a current sequence number.

5. The method according to claim 2, wherein the number of extended update packets is set dependent on the packet stream parameter.

6. The method according to claim 2, wherein said determining of the at least one packet stream parameter includes obtaining the number of subsequent packets for which the irregular change is valid.

7. The method according to claim 6, wherein said method further comprises comparing the maximum number of consecutive packet loss and the number of subsequent packets for which the irregular change is valid, and transmitting extended update packets only if the number of subsequent packets for which the irregular change is valid is larger than the maximum number of consecutive packet loss.

8. The method according to claim 6, wherein the number of subsequent packets for which the irregular change is valid is estimated by checking a RTP Payload Type field and accessing a codec look-up table.

9. The method according to claim 6, wherein the number of subsequent packets for which the irregular change is valid has been estimated by retrieving observed packet stream properties.

10. The method according to claim 1, wherein said method further comprises applying a safety factor to the determined at least one packet stream parameter.

11. An apparatus for transmitting data packets in a packet stream, the data packets having compressed headers, said apparatus comprising:
   a compressor for compressing a header using a context;
   a transmission unit for transmitting at least one update packet containing data indicating the context, wherein said transmission unit is for transmitting at least one non-update packet;
   a detection unit for detecting an irregular change of the packet stream; and
   a control unit for determining at least one packet stream parameter;
   wherein said transmission unit is for transmitting an extended update packet containing information about the irregular change if the determined at least one packet stream parameter does fulfill a predetermined condition;
   wherein said transmission unit is for transmitting an extended non-update packet containing information about the irregular change if the determined at least one packet stream parameter does not fulfill the predetermined condition; and
   wherein the extended non-update packet is not used to update the context.

12. The apparatus according to claim 11, wherein the packet stream parameter is the maximum number of consecutive packet loss.

13. The apparatus according to claim 12, wherein said apparatus further comprises a unit for entering a context update phase if the number of packets sent since a last update phase is larger than the maximum number of consecutive packet loss.

14. The apparatus according to claim 12, wherein the maximum number of consecutive packet loss is estimated by extracting a sequence number from a received non-acknowledgment message and comparing the extracted sequence number with a current sequence number.

15. The apparatus according to claim 12, wherein the number of extended update packets is set dependent on the packet stream parameter.

16. The apparatus according to claim 12, wherein said control unit determining the at least one packet stream parameter is for obtaining the number of subsequent packets for which the irregular change is valid.

17. The apparatus according to claim 16, wherein said apparatus further comprises a unit for comparing the maximum number of consecutive packet loss and the number of subsequent packets for which the irregular change is valid, and transmitting extended update packets only if the number of subsequent packets for which the irregular change is valid is larger than the maximum number of consecutive packet loss.

18. The apparatus according to claim 16, wherein the number of subsequent packets for which the irregular change is valid is estimated by checking a RTP Payload Type field and accessing a codec look-up table.

19. The apparatus according to claim 16, wherein the number of subsequent packets for which the irregular change is valid has been estimated by retrieving observed packet stream properties.

20. The apparatus according to claim 11, wherein said apparatus further comprises a unit for applying a safety factor to the determined at least one packet stream parameter.

* * * * *

UNITED STATES PATENT AND TRADEMARK OFFICE
CERTIFICATE OF CORRECTION

PATENT NO. : 7,158,518 B2 Page 1 of 1
APPLICATION NO. : 09/909823
DATED : January 2, 2007
INVENTOR(S) : Carsten Burmeister et al.

It is certified that error appears in the above-identified patent and that said Letters Patent is hereby corrected as shown below:

In column 3, line 37, please change "steam" to --stream-- after "packet".

Signed and Sealed this

First Day of May, 2007

JON W. DUDAS
*Director of the United States Patent and Trademark Office*